(12) United States Patent
Stamps et al.

(10) Patent No.: US 9,352,830 B2
(45) Date of Patent: May 31, 2016

(54) AIRCRAFT ROTOR WITH DISCRETE FLAP HINGE

(75) Inventors: Frank B. Stamps, Colleyville, TX (US); David A. Popelka, Colleyville, TX (US); Tom Donovan, Fort Worth, TX (US); Patrick R. Tisdale, Roanoke, TX (US); Richard E. Rauber, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 1034 days.

(21) Appl. No.: 13/455,814

(22) Filed: Apr. 25, 2012

(65) Prior Publication Data

US 2013/0287576 A1  Oct. 31, 2013

(51) Int. Cl.
*B64C 27/39* (2006.01)
*B64C 27/48* (2006.01)

(52) U.S. Cl.
CPC .............. *B64C 27/39* (2013.01); *B64C 27/48* (2013.01)

(58) Field of Classification Search
CPC ........ B64C 27/39; B64C 27/48; B64C 27/605
See application file for complete search history.

(56) References Cited

U.S. PATENT DOCUMENTS

| | | | |
|---|---|---|---|
| 2,774,553 A | 12/1956 | Jensen | |
| 3,865,511 A * | 2/1975 | Breuner | 416/141 |
| 4,142,833 A * | 3/1979 | Rybicki | B64C 27/48 384/221 |
| 4,323,332 A * | 4/1982 | Fradenburgh | 416/134 A |
| 4,795,310 A | 1/1989 | McArdle et al. | |
| 4,868,962 A * | 9/1989 | McArdle | B29C 70/347 29/428 |
| 5,738,494 A | 4/1998 | Schmaling | |
| 6,413,048 B1 * | 7/2002 | Muylaert | 416/134 A |
| 2007/0137956 A1 | 6/2007 | Stamps et al. | |
| 2013/0121827 A1 * | 5/2013 | Stamps et al. | 416/106 |

FOREIGN PATENT DOCUMENTS

WO    WO9105702 A1   5/1991

OTHER PUBLICATIONS

Office Action from counterpart application 2,805,167 issued from the Canadian Intellectual Property Office dated May 1, 2014, 2 pages.
Extended European Search Report from counterpart application 12176822.0 issued from the European Patent Office dated Sep. 20, 2012, 8 pages.
Office Action from counterpart application 12176822.0 issued from the European Patent Office dated Oct. 28, 2013, 4 pages.
Office Action dated Mar. 17, 2015 from counterpart CA App. No. 2,805,167.
Office Action dated Oct. 30, 2015 from counterpart CA App. No. 2,805,167.

\* cited by examiner

*Primary Examiner* — Craig Kim
*Assistant Examiner* — Michael Sehn
(74) *Attorney, Agent, or Firm* — James E. Walton

(57) ABSTRACT

An aircraft rotor assembly has upper and lower hub plates adapted to be mounted to a central rotor mast for rotation therewith. A plurality of radial arms is connected to at least two flap bearings mounted between the hub plates and forming a discrete flap hinge, each flap hinge defining a flap axis and allowing rotation of the associated arm relative to the hub plates and about the corresponding flap axis. Each of a plurality of blade grips is rotatably connected to one of the arms for rotation about a pitch axis and adapted for mounting of a blade to each blade grip, such that each blade is capable of rotation with the grip about the pitch axis and capable of rotation together with the corresponding arm relative to the hub plates and about the corresponding flap axis.

18 Claims, 10 Drawing Sheets

AIRCRAFT ROTOR WITH DISCRETE FLAP HINGE

BACKGROUND

1. Field of the Invention

The present application generally relates to aircraft rotors and specifically relates to aircraft rotors having a discrete flap hinge.

2. Description of Related Art

Rotary-wing aircraft, such as helicopters and tiltrotors, have at least one rotor for providing lift and propulsion forces. These rotors have at least two airfoil blades connected to a hub, and the hub is mounted on a rotatable mast driven in rotation by an engine or motor. These blades may be adjustable for pitch angle, and the pitch angle is typically controlled by a swashplate assembly and linkage for connecting a rotating portion of the swashplate assembly to each blade.

One example of a prior-art system includes a swashplate movable in directions parallel to the mast axis toward and away from the rotor for collective control. In addition, the swashplate assembly may provide for cyclic control through tilting of the swashplate assembly about axes perpendicular to the mast axis.

When the swashplate moves toward or away from the rotor, the pitch angle of each blade changes by the same amount, and in the same direction, as each other blade. This collective control system, which is often referred to as a "rise and fall" system, provides for control of the thrust of the rotor, which is measured generally coaxial to the mast. On the other hand, tilting of the swashplate causes the pitch of each blade to change sinusoidally, or cyclically, as the rotor rotates, which causes the rotor to develop lift forces that vary across the plane of the rotor.

In addition to the blade pitch changes, blades of a rotor may be allowed to flap, which is movement of the blades out of the plane of the rotor. This motion is caused by aerodynamic forces on the blades, and various systems provide for relief of the stresses in the root of the blades through articulating assemblies or through deformation of the blades or yoke.

Although great strides have been made in the art of rotor systems, significant shortcomings remain.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

Figure 1:
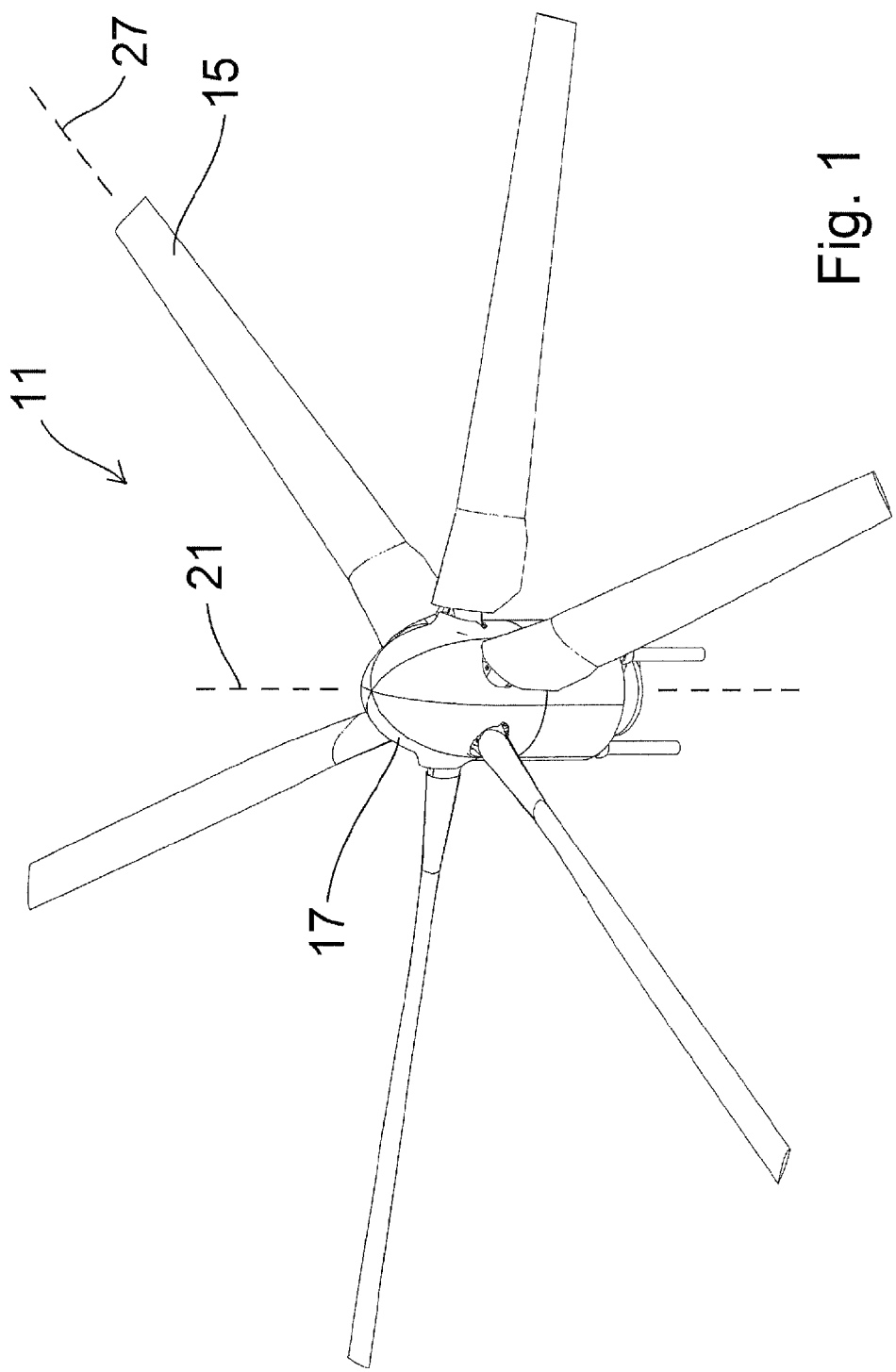
FIG. 1 is an oblique view of an embodiment of an aircraft rotor assembly.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

For example, the rotor assemblies shown in the drawings are shown in a generally vertical orientation in the drawings, which is the orientation of the rotor assembly for a helicopter or for a tiltrotor aircraft configured for rotor-borne flight in helicopter mode. In the following description, components of the assembly may be described in relation to this orientation in the drawings, though it should be understood that this is for descriptive purposes only, as the orientation of the assembly will change during use.

The system of the present application includes a rotor assembly providing for a discrete, offset flap hinge for each blade attached to the rotor assembly. The assembly provides at least two bearings that are spaced from each other laterally and create a flap-hinge for radial arms that connect blades to a rotor mast. The bearings are sandwiched between hub/drive plates, which provides for a stiff-in-plane configuration and for delta-3 (flap coupling) and delta-0 (cone coupling) that are required for stability while allowing for acceptable locations for the pitch links.

In the prior-art, discrete, offset flap hinges have been used in tail rotors on several helicopter types, such as the Mil Mi-4 and Mi-6 types and the Sikorsky H-34, H-37, H-3, H-54, and CH-53 types. However, their use in main rotor assemblies can be problematic due to the packaging of multiple blades forcing the blades radially outward to allow for a sufficient operating envelope. Moving the blades outward causes a larger hub moment to be generated due to rotor speed and Coriolis effects.

The hinge offset distance is defined as the distance between the flap hinge axis and the rotor mast axis, and the hinge offset is usually expressed as a percentage of total rotor radius. For example, if the hinge offset distance is 10 inches on a 100-inch tail rotor, then the hinge offset is 10%.

The rotor embodiments shown and described herein provide for configurations that allow for hinge offsets in the range of approximately 2% to approximately 15%, though the preferred amounts will typically fall in the range of approximately 5% to approximately 12%.

Figure 2:
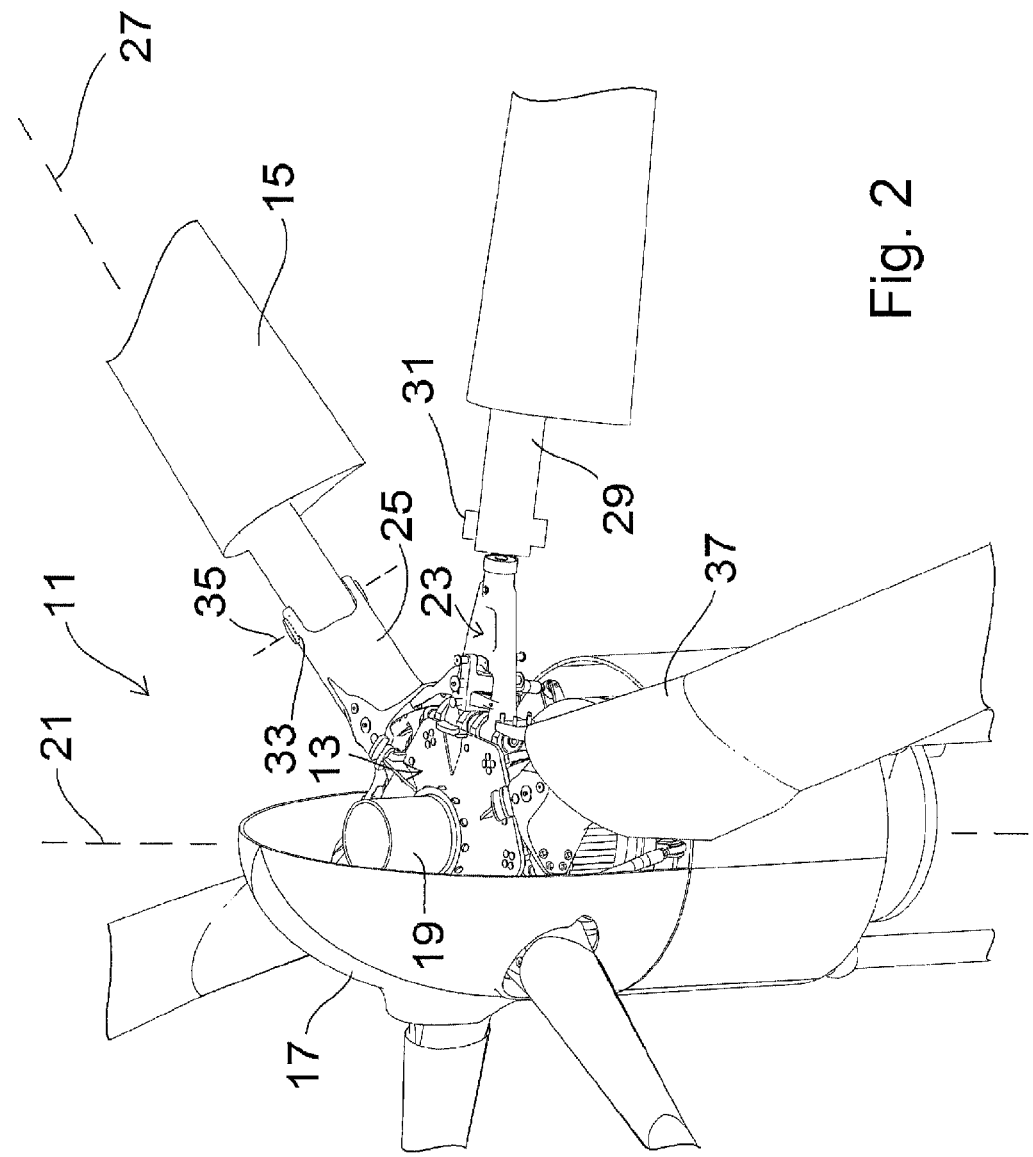
FIG. 2 is an oblique view of the rotor assembly of FIG. 1, portions of the assembly having been removed for ease of viewing.

Referring to FIGS. 1 and 2, a tiltrotor rotor assembly 11 comprises a central hub assembly 13 to which a plurality of blades 15 are attached. In FIG. 2, a number of components have been removed to ease viewing of hub assembly 13. An aerodynamic cover 17 covers hub assembly 13 to reduce aerodynamic drag and protect hub assembly 13 during operation. Hub assembly 13 is rigidly mounted to a mast 19 for rotation therewith about mast axis 21 when torque is applied to mast 19.

Referring now to FIGS. 2 through 5, hub assembly 13 comprises a plurality of articulating arms 23 extending radially. Each arm 23 has a blade grip 25 pivotally attached to allow for rotation of grip 25 relative to arm 23 about blade pitch axis 27. Each blade 15 has a blade root 29 extending from an inner radial end, and roots 29 are configured for being rotatably connected to grip 25. Each root 29 is configured for receiving a shaft 31, the ends of which fit within a corresponding pair of apertures 33 in a clevis 34 at an outer radial end of grip 25, allowing for selective pivoting of blade 15 relative to grip 25 about fold axis 35 when rotor 11 is not being operated for flight. This configuration positions the fold hinge as the outermost hinge assembly in rotor 11. An airfoil shaped cover 37 is mounted on the inner end of each blade 15 to reduce aerodynamic drag and protect grip 25 and blade root 29 during operation of rotor 11.

Figure 3:
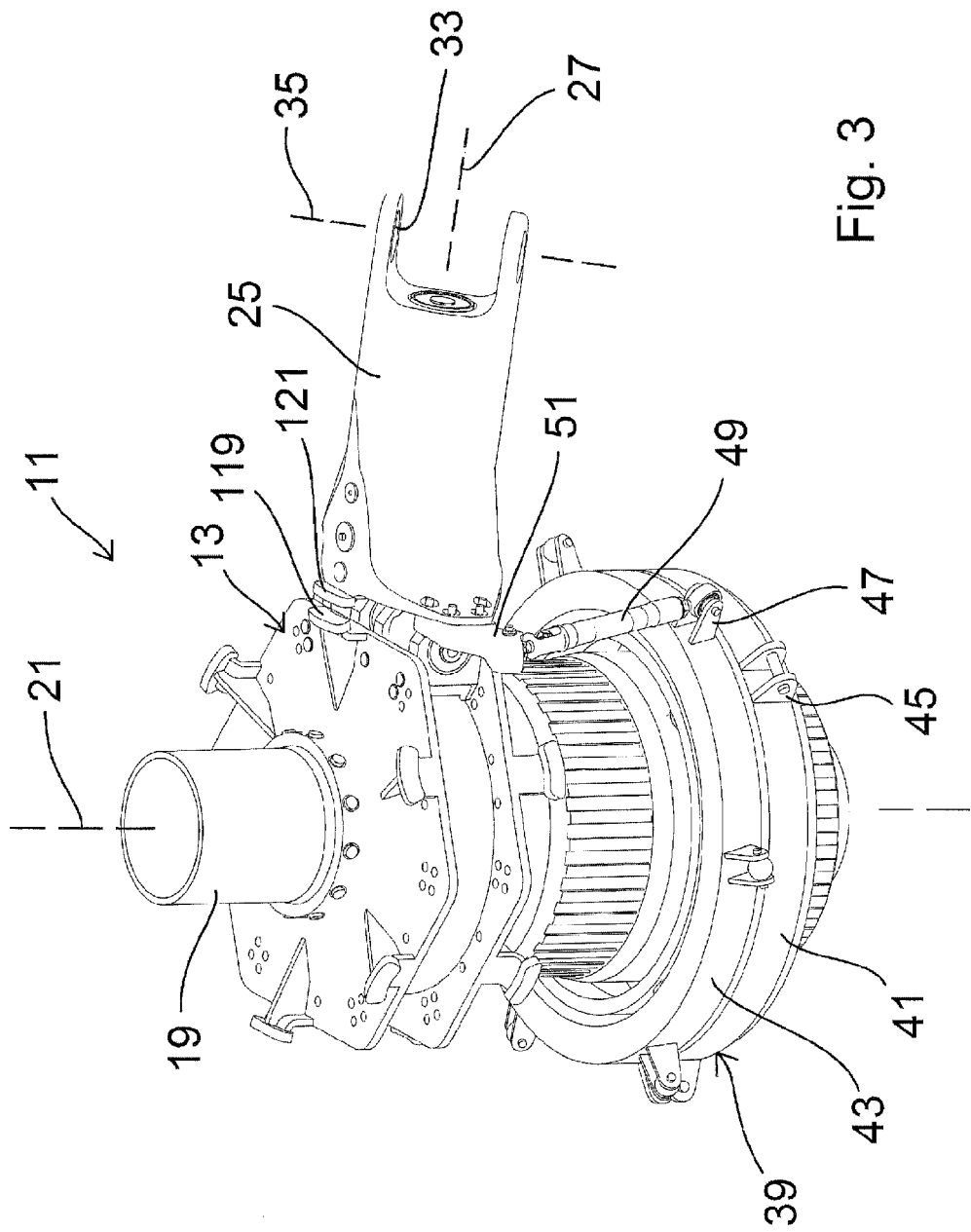
FIG. 3 is an oblique view of a portion of the rotor assembly of FIG. 1.

Referring now specifically to FIG. 3, hub assembly 13 is shown with only one arm 23 (not visible) and associated grip 25 attached. To provide for control of blade pitch about pitch axis 27, a rise-and-fall swashplate assembly 39 comprises a non-rotating swashplate 41 and a rotating swashplate 43. Swashplate assembly 39 is capable of axial translation (collective control) along mast axis 21 and tilting (cyclic control) relative to mast 19 about axes perpendicular to mast 19. Non-rotating swashplate 41 does not rotate with mast 19 and hub assembly 13 relative to the aircraft about mast axis 21, but rotating swashplate 43 is configured to rotate with mast 19 and hub assembly 13 about axis 21.

Flight control inputs, such as from a pilot or a flight control system, are mechanically transferred to non-rotating swashplate 41 through clevises 45, and these forces are transferred to rotating swashplate 43 through a bearing system that allows rotation about their shared axis as the only degree of freedom between swashplates 41, 43. The flight control inputs are then transferred from clevises 47 on rotating swashplate 43 to a pitch link 49 attached to each clevis 47. Each link 49 is connected to a pitch horn 51, which is mounted to an associated grip 25, allowing for movements of swashplate assembly 39 to cause collective and cyclic changes in the pitch of grips 25 and the attached blades 15.

Figure 4:
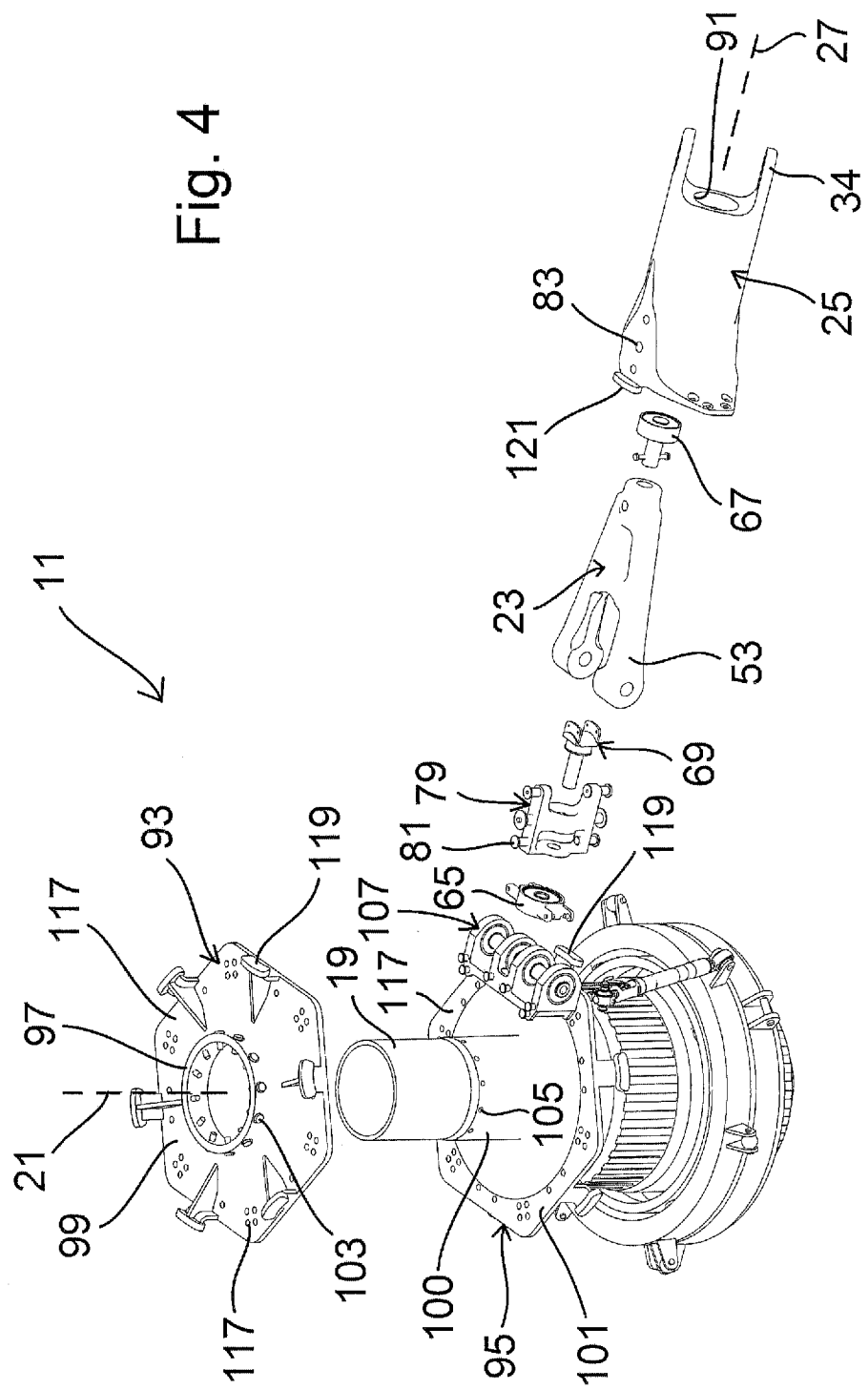
FIG. 4 is an oblique, exploded view of a portion of the rotor assembly of FIG. 1.
Figure 5:
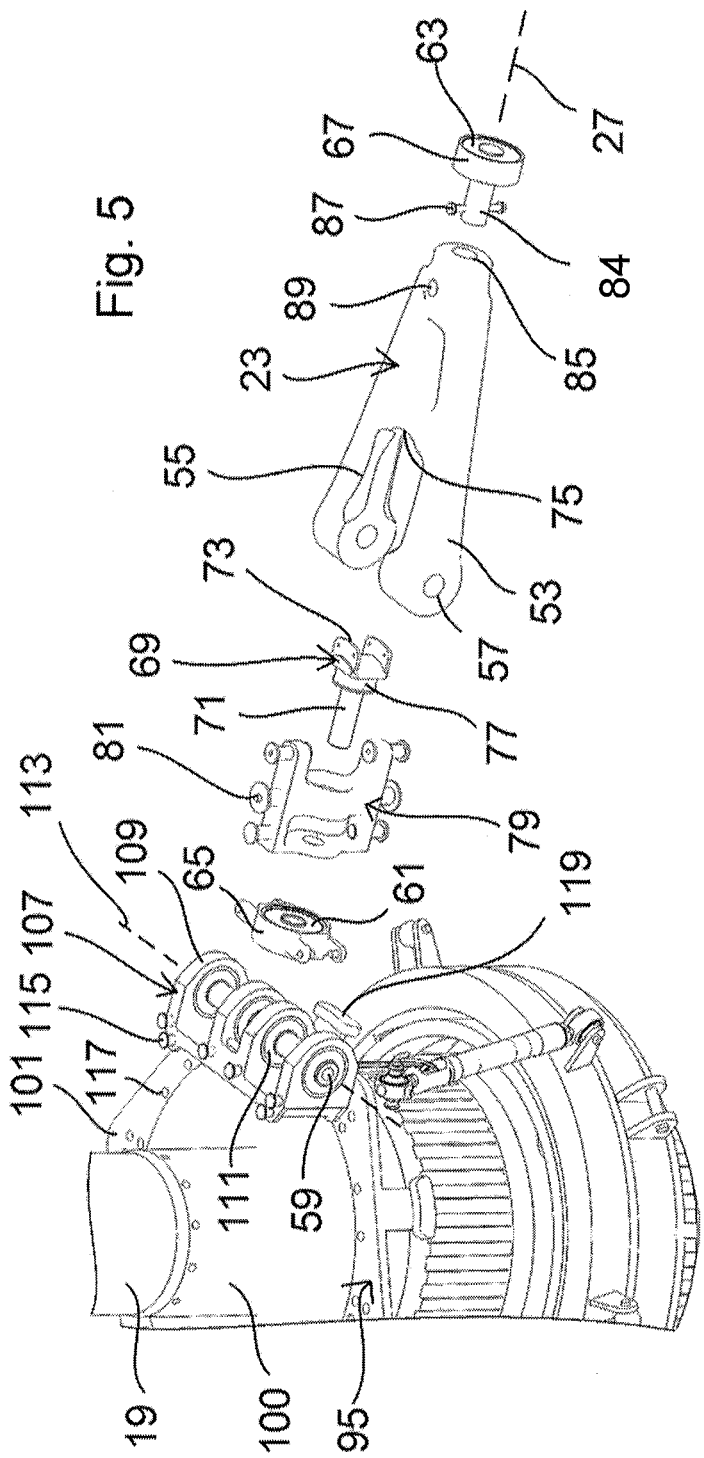
FIG. 5 is an oblique, exploded view of a portion of the rotor assembly of FIG. 1.
Figure 6:
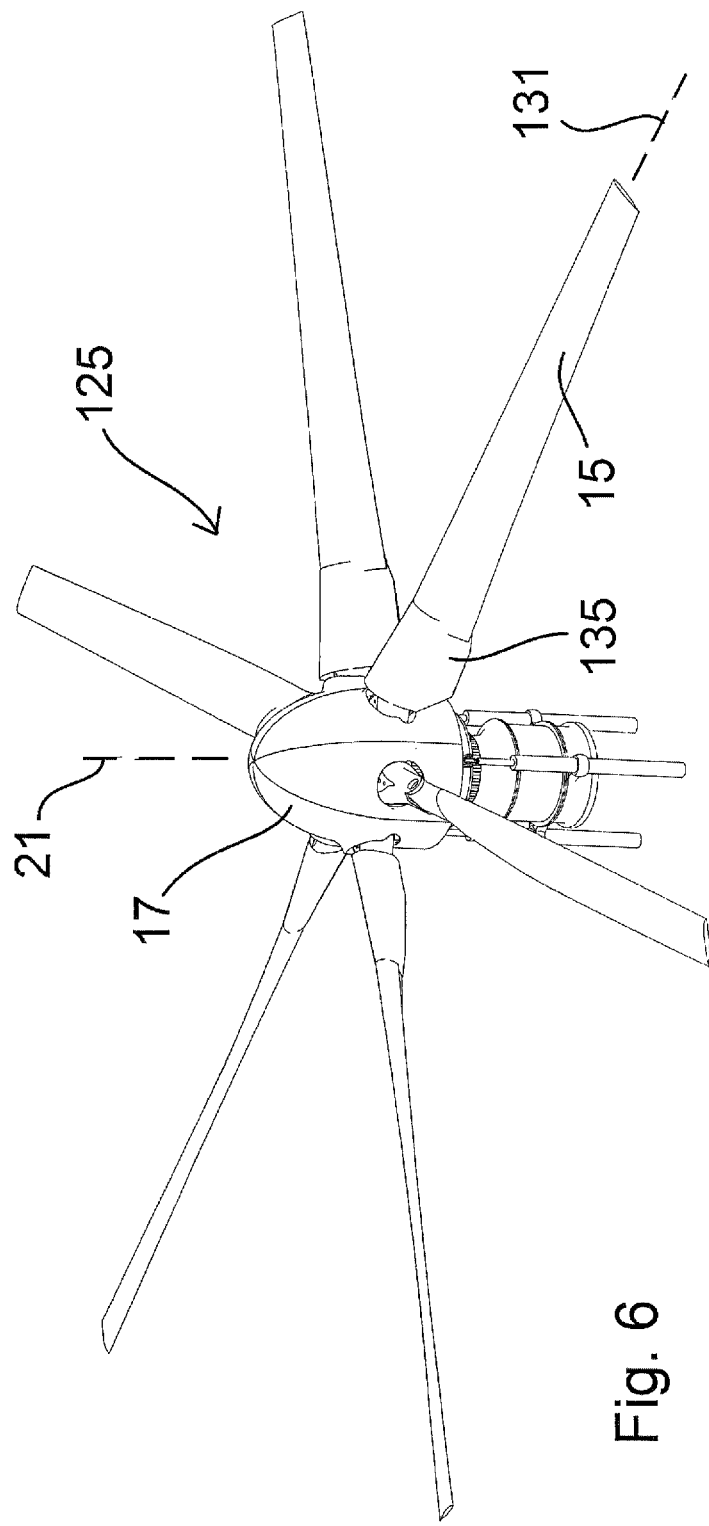
FIG. 6 is an oblique view of another embodiment of an aircraft rotor assembly.

Referring now specifically to FIGS. 4 and 5, hub assembly 13 is shown as exploded to allow for viewing of the components associated with each arm 23, only one of which is shown. Each arm 23 has a Y-shaped configuration, with two inner ends 53 separated by a void 55. Inner ends 53 have aligned apertures 57 for receiving a shaft 59. Arm 23 is configured to allow for grip 25 to be rotatably mounted thereto, allowing rotation of grip relative to arm 23 about pitch axis 27. To provide for this motion, arm 23 has an inner pitch bearing 61 and an outer pitch bearing 63. Bearing 61 is carried in a housing 65, which is rigidly mounted to an inner portion of grip 25, and bearing 63 is carried in a housing 67, which is rigidly mounted to an outer portion of grip 25. A centrifugal force bearing mount 69 has a shaft 71 that is inserted into the center of inner bearing 61, and a clevis 73 installs on central portion 75 of void 55. A centrifugal force bearing 77 is located on mount 69, and a grip mount 79 is configured to engage bearing 77. Shaft 71 passes through mount 79, and grip 25 is attached to grip mount 79 by fasteners 81 engaging apertures 83 in grip 25. For outer bearing 63, a shaft 84 is inserted into an aperture 85 in the outer end of arm 23, and fasteners 87 engage apertures 89 in arm 23 to secure housing 67 and bearing 63 to arm 23. Housing 67 is inserted into an aperture 91 in an outer end of grip 25, and bearings 61, 63 cooperate to define pitch axis 27 and allow rotation of grip 25 relative to arm 23. It should be noted that centrifugal loads are transmitted from blade 15 to arm 23 only through centrifugal force bearing 77 and that pitch bearings 61, 63 do not transmit centrifugal loads.

An upper hub plate 93 and a lower hub plate 95 are rigidly mounted to mast 19 for rotation therewith about mast axis 21. Upper plate 93 comprises a central ring 97 and a planar mounting flange 99 extending from ring 97. Lower plate 95 comprises a central cylinder 100 and a planar mounting flange 101 extending from a lower portion of cylinder 100. When assembled, ring 97 of upper plate 93 rigidly mounts to an upper end of cylinder 100 of lower plate 95, fasteners 103 engaging apertures 105 on cylinder 100. Fasteners 103 may extend through cylinder 100 and into mast 19 or, for example, into a sleeve carried on mast 19 for affixing plates 93, 95 to mast 19 for rotation therewith. Alternatively, other configurations, such as splines, may be used to rotationally affix plates 93, 95 to mast 19.

To connect arms 23 with mast 19 while allowing for flap motion of arms 23 relative to plates 93, 95, each arm 23 is rotatably mounted to plates 93, 95 with a hinge block 107. In the embodiment shown, each hinge block 107 comprises two pairs of bearing supports 109. A flap/centrifugal force bearing 111 is installed in each support 109, and the two pairs of coaxial bearings 111 cooperate to define a pitch axis 113 for arm 23. Supports 109 are configured to allow each inner end 53 of arm 23 to be installed between a pair of supports 109, shaft 59 extending through bearings 111 and through apertures 57 on arm 23. Hinge blocks 107 are rigidly mounted between plates 93, 95 in a radial array about mast axis 21, fasteners 115 on upper and lower surfaces of hinge blocks 107 engaging apertures 117 in plates 93, 95. Hinge blocks 107 are thereby "sandwiched" between plates 93, 95. In this configuration, bearings 111 act as both flapping bearings and centrifugal force bearings.

In operation, torque is applied to mast 19 to rotate mast 19 about mast axis 21. Hub plates 93, 95 rotate with mast 19, as do hinge blocks 107 mounted to plates 93, 95. The rotational force is transferred to blades 15 from hinge blocks 107 thorough arms 23 and grips 25. Each blade 15 is allowed to flap relative to plates 93, 95 about a corresponding flap axis 113 at a discrete flap hinge defined by the associated flap bearings 111, and each blade 15 is rotatable about a corresponding pitch axis 27 defined by pitch bearings 61, 63. Plates 93, 95 have flap stops 119 mounted on flanges 99, 101 for engaging corresponding bumpers 121 on grips 25 to limit the amount of flap motion of each arm 23 relative to plates 93, 95.

FIGS. 6 through 9 illustrate another embodiment of a rotor assembly having a discrete flap hinge for each of the attached blades.

Referring to FIGS. 6 through 9, a tiltrotor rotor assembly 125 comprises a central hub assembly 125 to which a plurality of blades 15 are attached. In FIG. 2, a number of components have been removed to ease viewing of hub assembly 125. An aerodynamic cover 17 covers hub assembly 125 to reduce aerodynamic drag and protect hub assembly 125 during operation. Hub assembly 125 is rigidly mounted to a mast 19 for rotation therewith about mast axis 21 when torque is applied to mast 19.

Figure 7:
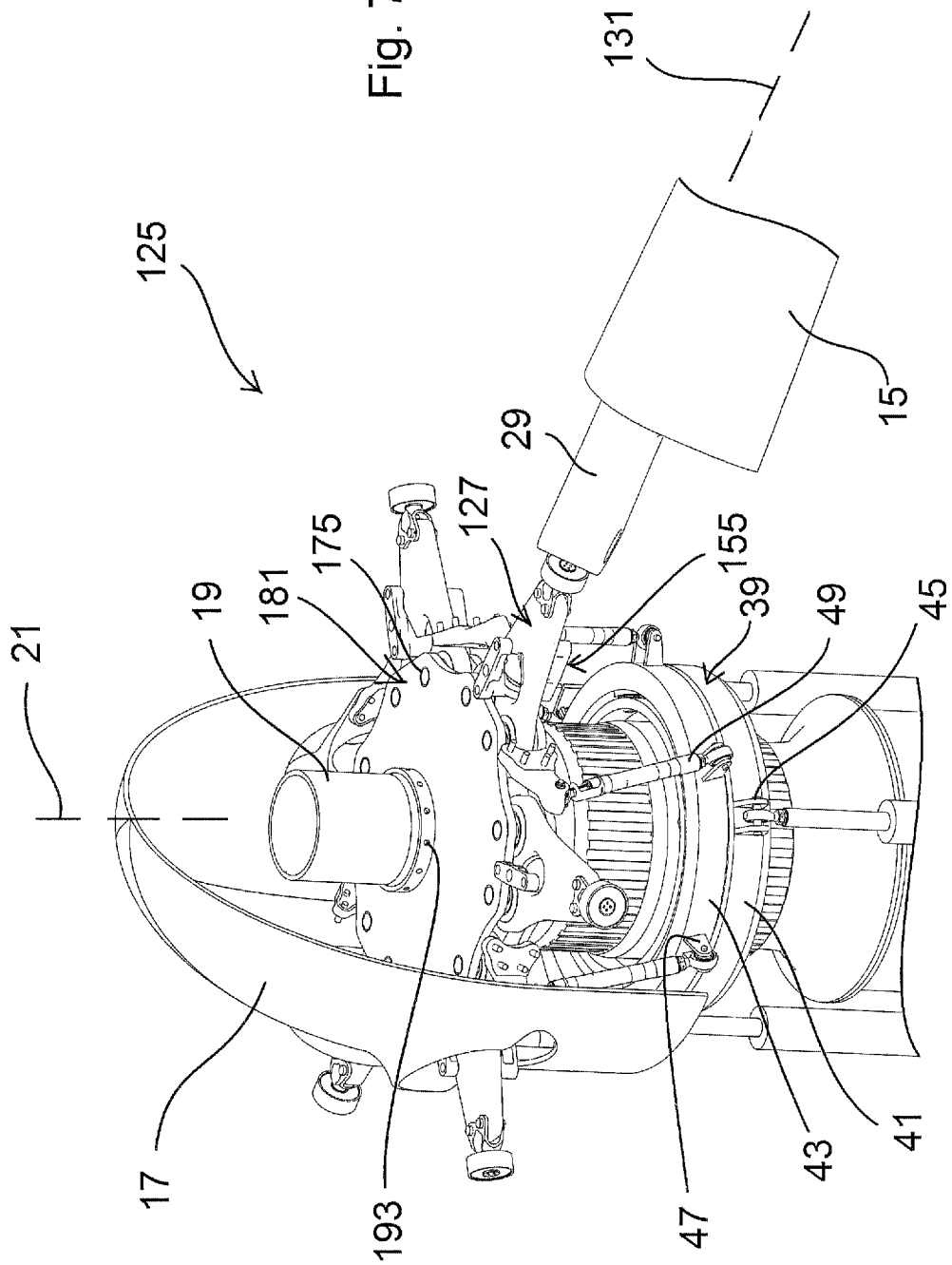
FIG. 7 is an oblique view of the rotor assembly of FIG. 6, portions of the assembly having been removed for ease of viewing.
Figure 8:
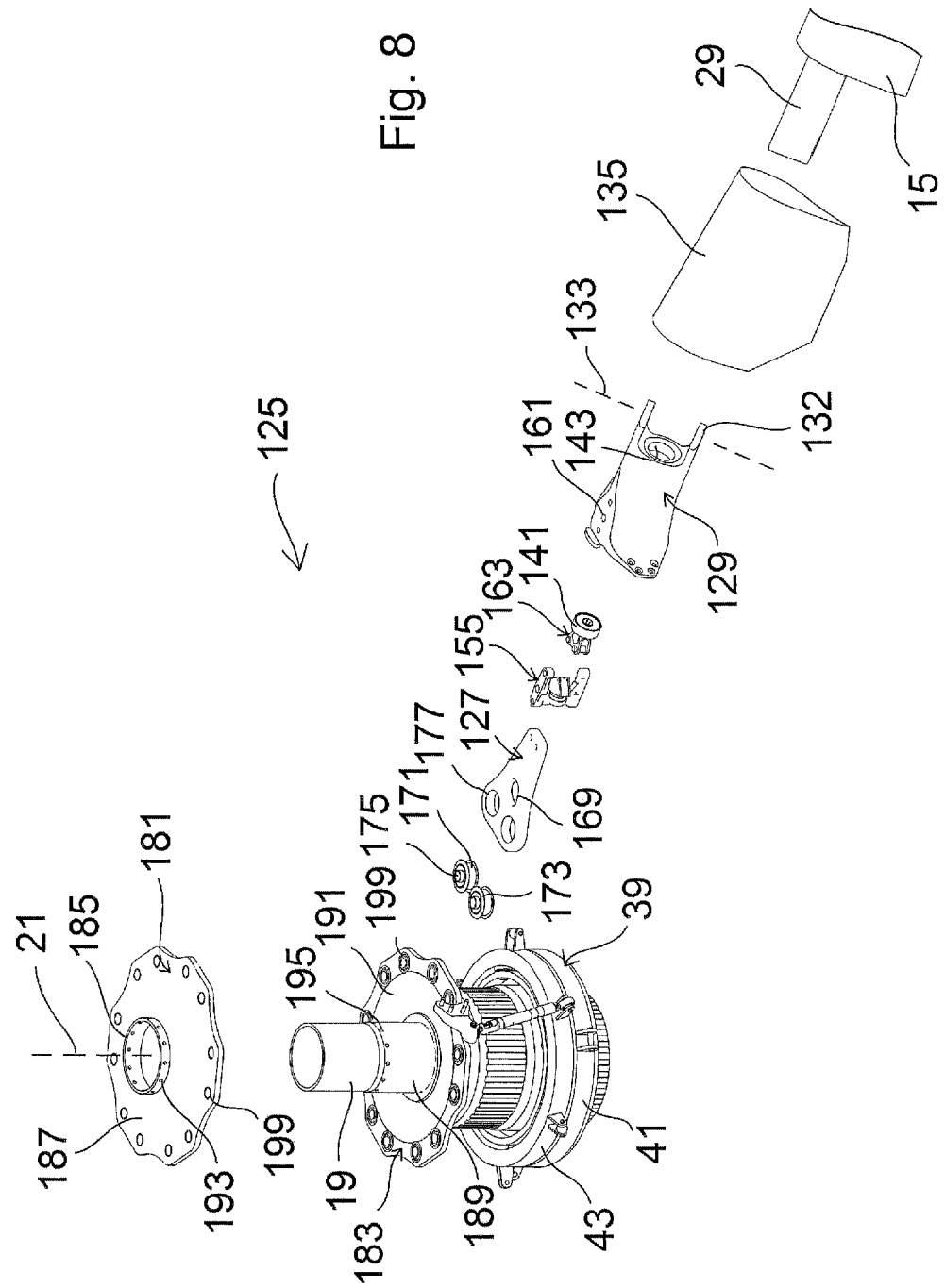
FIG. 8 is an oblique, exploded view of a portion of the rotor assembly of FIG. 6.
Figure 9:
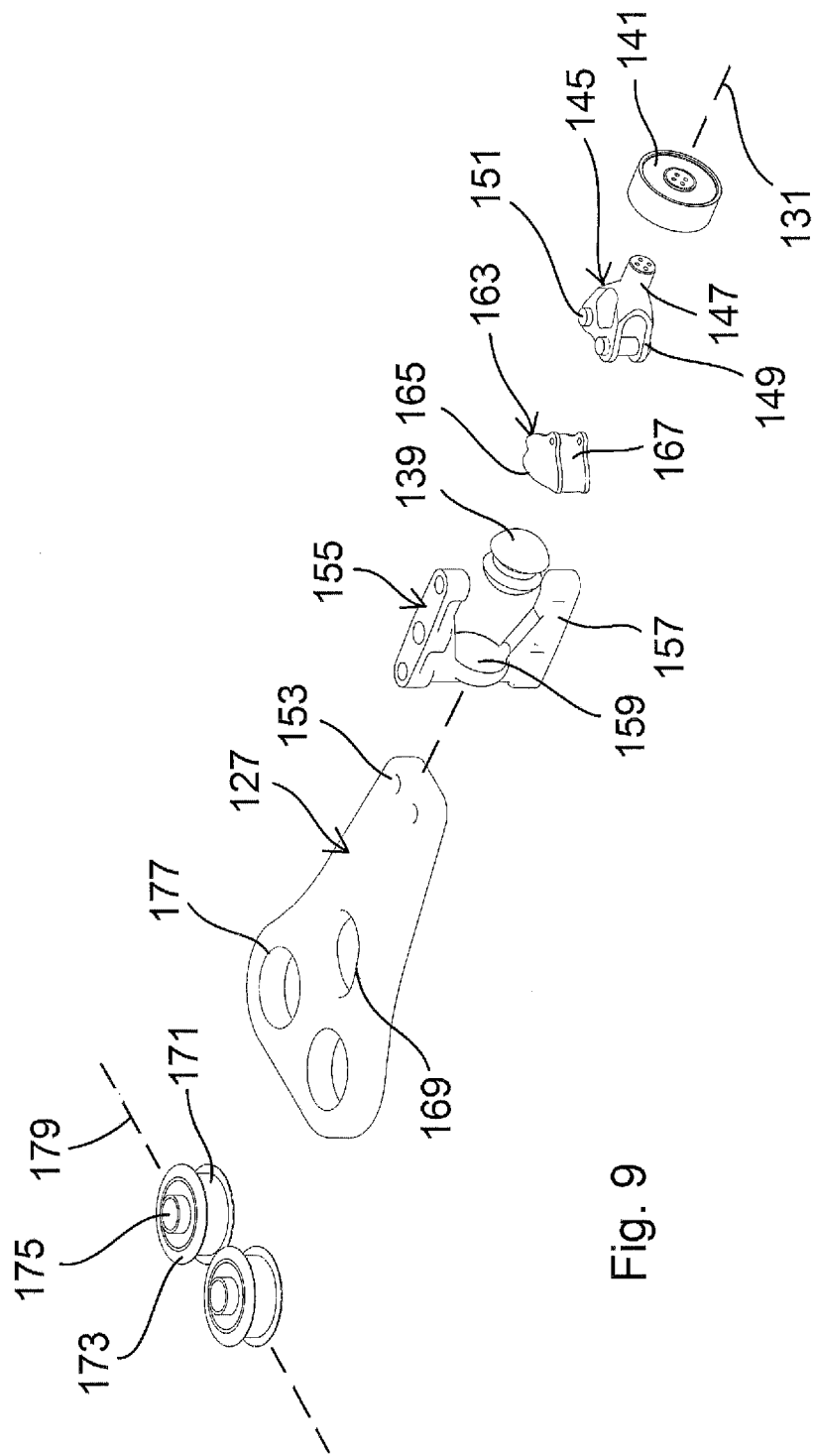
FIG. 9 is an oblique, exploded view of a portion of the rotor assembly of FIG. 6.

Referring now to FIGS. 7 through 9, hub assembly 125 comprises a plurality of articulating arms 127 extending radially. Each arm 127 has a blade grip 129 pivotally attached to allow for rotation of grip 129 relative to arm 127 about blade pitch axis 131. Each blade 15 has a blade root 29 extending from an inner radial end, and roots 29 are configured for being rotatably connected to a clevis 132 of grip 129 and allowing for selective pivoting of blade 15 relative to grip 129 about fold axis 133 when rotor 11 is not being operated for flight. This configuration positions the fold hinge as the outermost hinge assembly in rotor 125. An airfoil shaped cover 135 is mounted on the inner end of each blade 15 to reduce aerodynamic drag and protect grip 129 and blade root 29 during operation of rotor 125.

Referring now specifically to FIG. 7, hub assembly 125 is shown with only one arm 127 attached. To provide for control of blade pitch about pitch axis 131, a rise-and-fall swashplate assembly 39 comprises a non-rotating swashplate 41 and a rotating swashplate 43. As described above, swashplate assembly 39 is capable axial translation and tilting relative to mast 19 Flight control inputs are mechanically transferred to non-rotating swashplate 41 through clevises 45, and these forces are transferred to rotating swashplate 43. The flight control inputs are then transferred from clevises 47 on rotating swashplate 43 to a pitch link 49 attached to each clevis 47. Each link 49 is connected to a pitch horn 137, which is mounted to an associated grip 129, allowing for movements of swashplate assembly 39 to cause collective and cyclic changes in the pitch of grips 129 and the attached blades 15.

Referring also to FIGS. 8 and 9, hub assembly 125 is shown as exploded to allow for viewing of the components associated with each arm 127, only one of which is shown. Each arm 127 is preferably formed from a composite material, such as carbon fiber and epoxy resin, and has a generally planar configuration that tapers in width toward the outer end. Arm 127 is configured to allow for grip 129 to be rotatably mounted thereto, allowing rotation of grip relative to arm 127 about pitch axis 131. To provide for this motion, arm 127 has a spherical inner pitch/centrifugal force bearing 139 and an outer pitch bearing 141, bearings 139, 141 cooperating to define pitch axis 131. When assembled, bearing 141 is carried within an aperture 143 an outer end of grip 129.

A bearing mount 145 has a shaft 147 that is inserted into the center of inner bearing 141, and a clevis 149 installs on an outer end portion of arm 127, shafts 151 engaging apertures 153 for retaining mount 145 on arm 127. A U-shaped grip mount 155 has two members 157 extending outward and a central bearing cup 159 for receiving the inner portion of bearing 139, and grip 129 is attached to grip mount 155 by fasteners (not shown) that engage members 157 through apertures 161 in grip 129. An outer bearing carrier 163 has a bearing cup 165 for receiving the outer portion of bearing 139 and a clevis 167 for engaging an outer portion of central aperture 169 of arm 127. In this embodiment, centrifugal loads are transmitted from blade 15 to arm 127 only by pitch/centrifugal force bearing 139 and that pitch motion is provided by the combination of bearings 139, 141.

Two spherical flap/centrifugal force bearings 171 are provided for each arm 127, and each bearing 171 is mounted in a housing 173 having upper and lower lugs 175 extending therefrom. Bearings 171 are mounted in coplanar bearing apertures 177 located at an inner end of arm 127, and bearings 171 of each arm 127 cooperate to define a flap axis 179 for that arm 127.

An upper hub plate 181 and a lower hub plate 183 are rigidly mounted to mast 19 for rotation therewith about mast axis 21. Upper plate 181 comprises a central ring 185 and a planar mounting flange 187 extending from ring 185. Lower plate 183 comprises a central cylinder 189 and a planar mounting flange 191 extending from a lower portion of cylinder 189. When assembled, ring 185 of upper plate 181 rigidly mounts to an upper end of cylinder 189 of lower plate 183, fasteners 193 engaging apertures 195 on cylinder 189. Fasteners 193 may extend through cylinder 189 and into mast 19 or, for example, into a sleeve carried on mast 19 for affixing plates 181, 183 to mast 19 for rotation therewith. Alternatively, other configurations, such as splines, may be used to rotationally affix plates 181, 183 to mast 19.

To connect arms 127 with mast 19 while allowing for flap motion of arms 127 relative to plates 181, 183, bearings 171 of each arm 127 are rotatably mounted to plates 181, 183. When plates 181, 183 are assembled, bearing housings 173 are rigidly mounted between plates 181, 183 in a radial array about mast axis 21, lugs 175 engaging apertures 199 in plates 181, 183. Bearings 171 and housings 173 are thereby "sandwiched" between plates 181, 183. In this configuration, bearings 171 act as both flapping bearings and centrifugal force bearings.

In operation, torque is applied to mast 19 to rotate mast 19 about mast axis 21. Hub plates 181, 183 rotate with mast 19, as do bearings 171 mounted to plates 181, 183. The rotational force is transferred to blades 15 from bearings 171 thorough arms 127 and grips 129. Each blade 15 is allowed to flap relative to plates 181, 183 about a corresponding flap axis 179 at a discrete flap hinge defined by the associated flap bearings 171, and each blade 15 is rotatable about a corresponding pitch axis 131 defined by bearings 139, 141. Though not shown, plates 181, 183 may have optional flap stops, like stops 119 described above for assembly 11, which can be mounted on flanges 187, 191 for engaging optional corresponding bumpers (not shown) on grips 129 to limit the amount of flap motion of each arm 127 relative to plates 181, 183.

Figure 10:
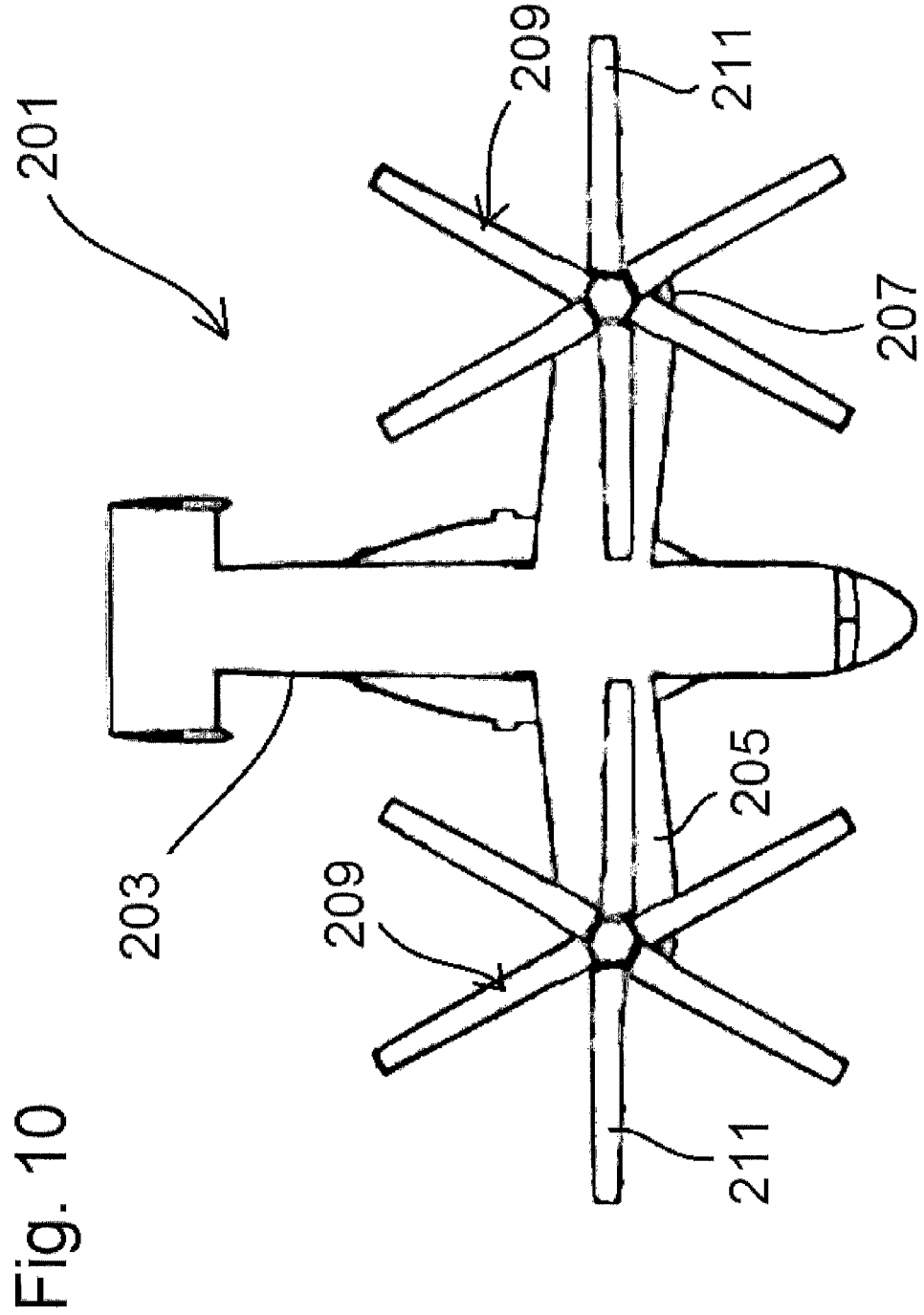
FIG. 10 is a top view of an aircraft having a pair of rotor assemblies installed thereon.

Referring to FIG. 10, tiltrotor aircraft 201 includes a fuselage 203 and wing 205 attached to fuselage 203. Rotating engine nacelles 207 are pivotally mounted to opposing ends of wing 205 and house engines (not shown) for supplying torque to turn a rotor mast housed in each nacelle 207. Two discrete flap-hinge rotor assemblies 209, being constructed like assembly 11 or assembly 125, as described above, are each attached to a rotor mast. Blades 211 are thus driven in rotation by the torque from the engines. Tiltrotor 201 is capable of flying in a helicopter mode, in which each nacelle

207 is positioned approximately vertical (as shown), and flying in an airplane mode, in which each nacelle 207 is positioned approximately horizontal.

Tiltrotor 201 is illustrated as an exemplary aircraft that may employ the system of the present application. It should be appreciated any variety of aircraft types may use the system of the present application for main rotor blades, tail rotor blades, or propellers. A non-exhaustive list of exemplary aircraft types may include airplanes, gyrocopters, and unmanned aircraft.

Rotor assemblies with discrete flap hinges and a stiff-in-plane configuration, as described above, provide for several advantages, including: 1) compactness; 2) low weight; and 3) allowing for desired dynamic characteristics.

While the foregoing has been described with reference to illustrative embodiments, this description is not intended to be construed in a limiting sense. Various modifications and combinations of the illustrative embodiments, as well as other embodiments, will be apparent to persons skilled in the art upon reference to the description.

The invention claimed is:

1. An aircraft rotor assembly, comprising:
    a lower hub plate, comprising a cylinder located centrally;
    an upper hub plate, comprising a ring located centrally, the ring configured for coupling the upper hub plate to the cylinder of the lower hub plate;
    the upper and the lower hub plates adapted to be mounted to a central rotor mast for rotation therewith;
    a plurality of radial arms, each arm being connected to at least two flap bearings mounted between the hub plates and forming a discrete flap hinge, each flap hinge defining a flap axis and allowing rotation of the associated arm relative to the hub plates and about the corresponding flap axis; and
    a plurality of blade grips, each grip being rotatably connected to one of the arms for rotation about a pitch axis and adapted for mounting of a blade to each blade grip, such that each blade is capable of rotation with the grip about the pitch axis and capable of rotation together with the corresponding arm relative to the hub plates and about the corresponding flap axis;
    wherein the at least two flap bearings are rigidly mounted directly to the upper hub plate and the lower hub plate; and
    wherein the at least two flap bearings rotate with the upper and lower hub plates.

2. The assembly of claim 1, wherein each flap hinge comprises coaxial flap bearings.

3. The assembly of claim 1, wherein each flap hinge comprises a hinge block for carrying the flap bearings, each arm being rotatably connected to one of the hinge blocks.

4. The assembly of claim 1, wherein each flap hinge comprises a hinge block for carrying the flap bearings, each arm being rotatably connected to one of the hinge blocks; and
    wherein each hinge block comprises coaxial flap bearings.

5. The assembly of claim 1, wherein each flap hinge comprises a hinge block for carrying the flap bearings, each arm being rotatably connected to one of the hinge blocks; and
    wherein each hinge block comprises two pairs of coaxial flap bearings, and each arm comprises a pair of inner ends, each inner end being installed between the bearings in one of the pairs of bearings.

6. The assembly of claim 1, wherein each flap hinge comprises coplanar flap bearings.

7. The assembly of claim 1, wherein each flap hinge comprises at least a pair of coplanar spherical bearings.

8. The assembly of claim 1, further comprising:
    flap stops configured to limit the amount of relative rotation between the arms and the hub plates.

9. The assembly of claim 1, wherein a flap hinge offset percentage is between approximately 5% and approximately 12%.

10. An aircraft rotor having a plurality of blades, the rotor comprising:
    a lower hub plate, comprising a cylinder located centrally;
    an upper hub plate, comprising a ring located centrally, the ring configured for coupling the upper hub plate to the cylinder of the lower hub plate;
    the upper and the lower hub plates adapted to be mounted to a central rotor mast for rotation therewith;
    a plurality of hinge blocks rigidly mounted between the upper and lower hub plates in a radial array, each hinge block being associated with one of the blades and defining a flap axis for each blade;
    a plurality of radial arms, each arm being rotatably connected to one of the hinge blocks for rotation about the corresponding flap axis; and
    a plurality of blade grips, each grip being rotatably connected to one of the arms for rotation about a pitch axis and configured for mounting of a blade to each blade grip, such that each blade is capable of flap motion relative to the hub plates about the corresponding flap axis.

11. The rotor of claim 10, wherein each flap hinge comprises coaxial flap bearings.

12. The rotor of claim 10, wherein each hinge block comprises two pairs of coaxial flap bearings, and each arm comprises a pair of inner ends, each inner end being installed between the bearings in one of the pairs of bearings.

13. The rotor of claim 10, further comprising:
    flap stops configured to limit the amount of relative rotation between the arms and the hub plates.

14. The rotor of claim 10, wherein a flap axis offset percentage is between approximately 5% and approximately 12%.

15. An aircraft rotor having a plurality of blades, the rotor comprising:
    a lower hub plate, comprising a cylinder located centrally;
    an upper hub plate, comprising a ring located centrally, the ring configured for coupling the upper hub plate to the cylinder of the lower hub plate;
    the upper and the lower hub plates adapted to be mounted to a central rotor mast for rotation therewith;
    a plurality of sets of coplanar flap bearings mounted between the upper and lower hub plates in a radial array, each set of flap bearings being associated with one of the blades and defining a flap axis for each blade;
    a plurality of radial arms, each arm being rotatably connected to one of the sets of flap bearings for rotation about the corresponding flap axis; and
    a plurality of blade grips, each grip being rotatably connected to one of the arms for rotation about a pitch axis and configured for mounting of a blade to each blade grip, such that each blade is capable of flap motion relative to the hub plates about the corresponding flap axis;
    wherein the plurality of sets of coplanar flap bearings rotate with the upper and lower hub plates.

16. The rotor of claim 15, wherein each set of flap bearings comprises at least a pair of coplanar spherical bearings.

17. The rotor of claim 15, further comprising:
flap stops configured to limit the amount of relative rotation between the arms and the hub plates.

18. The rotor of claim 15, wherein a flap axis offset percentage is between approximately 5% and approximately 12%.

* * * * *